United States Patent
Kang (10) Patent No.: US 9,535,648 B2
(45) Date of Patent: Jan. 3, 2017

(54) DISPLAY SYSTEM AND CONTROL METHOD THEREOF

(71) Applicant: SAMSUNG ELECTRONICS CO., LTD., Suwon-si (KR)

(72) Inventor: Hee-young Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 212 days.

(21) Appl. No.: 14/270,575

(22) Filed: May 6, 2014

(65) Prior Publication Data

US 2014/0368409 A1 Dec. 18, 2014

(30) Foreign Application Priority Data

Jun. 17, 2013 (KR) .................... 10-2013-0069288

(51) Int. Cl.
G06F 3/14 (2006.01)
G09G 5/00 (2006.01)
G06T 3/40 (2006.01)

(52) U.S. Cl.
CPC ............. G06F 3/1446 (2013.01); G09G 5/005 (2013.01); *G06F 3/1438* (2013.01); *G06T 3/40* (2013.01); *G09G 2300/026* (2013.01); *G09G 2340/04* (2013.01); *G09G 2340/0492* (2013.01); *G09G 2370/042* (2013.01)

(58) Field of Classification Search
CPC .................. G06F 3/14; G06F 3/1423–3/1446; G09G 5/363; G09G 5/366; G09G 2300/02–2300/026; G09G 2340/04–2340/0492; G09G 2370/04–2370/047; G09G 5/003–5/008
See application file for complete search history.

(56) References Cited

U.S. PATENT DOCUMENTS

2009/0146917 A1* 6/2009 Kharrati ............... G09G 3/32 345/46
2012/0062475 A1* 3/2012 Locker .................. G06F 3/041 345/173
2012/0162158 A1* 6/2012 Choi ...................... G09G 5/003 345/204

FOREIGN PATENT DOCUMENTS

EP          2 501 115 A1    9/2012
WO       2010028404 A1    3/2010

OTHER PUBLICATIONS

Search Report dated Nov. 4, 2014 issued by the European Patent Office in counterpart European Patent Application No. 14172604.2.
Communication issued Oct. 12, 2016, issued by the European Patent Office in counterpart European Patent Application No. 14172604.2.

* cited by examiner

*Primary Examiner* — Nathan Danielsen
(74) *Attorney, Agent, or Firm* — Sughrue Mion, PLLC (57) ABSTRACT

A display system is disclosed. The display system includes a plurality of display apparatuses which are rotated in a vertical direction and disposed parallel to each other, wherein the plurality of display apparatuses may reverse and change the width and height of one received image, and may display each of the divided sub images by as many as the number of the plurality of display apparatuses, according to a location of disposition. Accordingly, the plurality of display apparatuses may display an image in the same ratio of a screen ratio of a received image without ratio readjustment or data distortion.

20 Claims, 11 Drawing Sheets

DISPLAY SYSTEM AND CONTROL METHOD THEREOF

CROSS-REFERENCE TO RELATED APPLICATION(S)

This application claims priority from Korean Patent Application No. 10-2013-0069288, filed on Jun. 17, 2013, in the Korean Intellectual Property Office, the disclosure of which is incorporated herein by reference, in its entirety.

BACKGROUND

1. Field

Aspects of the exemplary embodiments relate to a display system and a control method thereof. More particularly, the exemplary embodiments relate to a display system composed of a plurality of display apparatuses and a control method thereof.

2. Description of the Prior Art

A video wall indicates a system embodied by disposing a plurality of display apparatuses capable of outputting an image on a plane, so that the plurality of display apparatuses are operable as if they were one display apparatus displaying an image on one large screen.

The video wall system experienced a problem that distortion can occur while an image is converted from an image customized to the size of one display apparatus, to be displayed on a plurality of display apparatuses.

Figure 1:
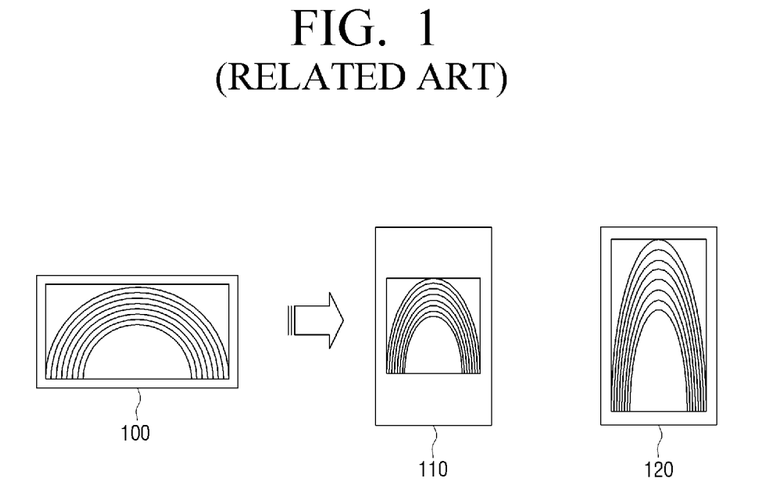
FIG. 1 is a view which explains problems of the related art.

That is, when an image which has been displayed on a horizontal screen is readjusted to a vertical screen, data is distorted. As shown in FIG. 1, in response to an image 100 of a horizontal screen having a 16:9 aspect ratio being rotated to a vertical screen, the image is readjusted to an image 110 whose width and height are reduced. Or, in response to the image being displayed as a full screen image 120 on a vertical screen, the ratio is not appropriate, thereby making the image difficult to understand.

SUMMARY

An aspect of the exemplary embodiments is to provide a display system which appropriately disposes a plurality of display apparatuses and displays one image, and a control method thereof.

A display system according to an exemplary embodiment includes a plurality of display apparatuses, each of which is configured to be rotated in a vertical direction and disposed in parallel with each other, wherein the plurality of display apparatuses are configured to reverse and change width and length of one received image, and individually display each of a plurality of sub images divided by as many as a number of the plurality of display apparatuses, according to a location at which the display apparatuses are disposed.

Each of the plurality of display apparatuses includes a display, a receiver configured to receive an image signal, and a controller configured to reverse and change the width and length of the one received image, and display a sub image which corresponds to the location of disposition on the display, from among a plurality of sub images divided by as many as the number of the plurality of display apparatuses.

Herein, the controller may determine the location of disposition based on a number of connected input ports of the receiver.

Each of the plurality of display apparatuses may further include an interface configured to receive setting information on the location of disposition, wherein each of the controllers may determine the location of disposition based on the received setting information.

A screen ratio of each display is the same, and each of the controllers may adjust the sub image which corresponds to the location of disposition in the screen ratio of the display and display the sub image on the display.

In addition, the display apparatus may be three in number, and the three display apparatuses may be rotated respectively in a vertical direction and disposed in parallel to each other so that a display of each of the display apparatus constitutes one full screen.

The screen ratio of width to length is 16:9, wherein the full screen ratio of width to length is 16:9.

A display apparatus according to an exemplary embodiment includes a display, a controller configured to reverse and change width and length of one image, when the display apparatus is disposed along with at least one other display apparatus while being rotated in a vertical direction, and display a sub image which corresponds to a location of disposition of the display apparatus from among sub images divided by as many sub images as the number of the plurality of display apparatuses on the display.

A method of control using a plurality of display apparatuses may include receiving an image to be displayed on the plurality of display apparatuses, while each of the plurality of display apparatuses is rotated in a vertical direction and is disposed parallel to each other; reversing and changing the width and length of the image, and dividing the changed image into a plurality of sub images by as many as the number of the plurality of display apparatuses; and displaying a sub image which corresponds to a location of disposition of each of the plurality of display apparatuses.

In addition, the displaying a sub image may include determining the location of disposition based on a number of a connected input port.

Receiving setting information on the location of disposition may be further included, wherein the displaying a sub image may include determining the location of disposition based on the received setting information.

The displaying a sub image may include adjusting and displaying a sub image which corresponds to the location of disposition in a screen ratio of a display.

In addition, the plurality of display apparatuses constitute one set where three display apparatuses may be respectively rotated in a vertical direction and disposed in parallel to each other, wherein the one set where three displays are disposed in parallel to each other displays one full screen.

The screen ratio of width to length is 16:9, wherein the full screen ratio of width to length is 16:9.

An aspect of an exemplary embodiment may further provide a video wall system embodying an advertisement board or a large display by enlarging and displaying a received image without distorting the image, the system including; a plurality of display apparatuses configured to individually display a plurality of sub images divided from the received image; wherein each of the plurality of display apparatuses includes: a receiver configured to receive an image; a controller configured to reverse and change the width and height of the received image, change a horizontal image into a vertical image, and divide the changed image into the plurality of sub images according to the number of the plurality of display apparatuses; and a display configured to display an individual sub image which corresponds to a location of disposition of each of the plurality of display apparatuses, The system may display an enlarged image while maintaining an aspect ratio of the received image. The controller may be configured to reverse and change the width and length of the received image when the display apparatus is disposed along with at least one other display apparatus while being rotated in a vertical direction.

The controller may determine the location of disposition based on a number of a connected input port of the receiver.

The display system may further include an interface configured to receive setting information related to the location of disposition, wherein each controller is configured to determine the location of disposition based on the received setting information.

A screen ratio of each display may be the same, and each of the controllers may be configured to adjust the sub image which corresponds to the location of disposition in the screen ratio of the display and display the sub image on the display.

In addition, the display apparatuses may be three in number, and the three display apparatuses may be configured to be respectively rotated in a vertical direction and disposed in parallel with each other so that a display of each display apparatus constitutes one full screen.

According to the above-described various exemplary embodiments, a plurality of display apparatuses may display an image in the same aspect ratio of a screen ratio of a received image without ratio readjustment or data distortion.

BRIEF DESCRIPTION OF THE DRAWINGS

The above and/or other aspects of the exemplary embodiments will be more apparent with reference to the accompanying drawings, in which.

DESCRIPTION OF THE EXEMPLARY EMBODIMENTS

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, exemplary embodiments can be practiced without those specifically defined matters. Also, well-known functions or constructions are not described in detail since they would obscure the application with unnecessary detail.

Figure 2:
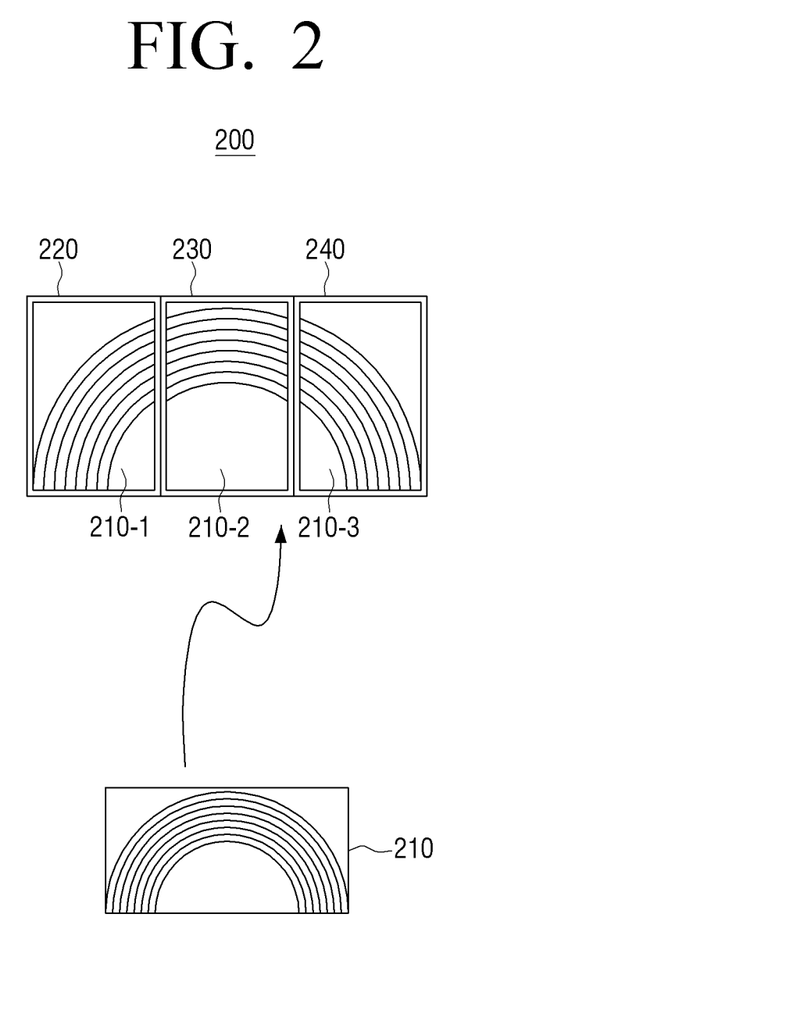
FIG. 2 is a view which illustrates a display system according to an exemplary embodiment.

FIG. 2 is a view which illustrates a display system according to an exemplary embodiment.

Referring to FIG. 2, a display system 200 may include a plurality of display apparatuses 220, 230, 240 which are rotated in a vertical direction and disposed in parallel to each other. Herein, in FIG. 2, a plurality of display apparatuses which are rotated in a vertical direction and disposed in parallel to each other are a video wall. The video wall indicates a forming of a large screen by piling up many video screens, and one video screen indicates one sector. Here, each of the screens are gathered to form one large screen.

A video wall system is a multi image processor which receives an image signal from a source device such as VTR and displays various images on a large screen, and this system may control a plurality of screens. In addition, each video screen may display a part of an entire image or may each repeatedly display the same image.

Such a video wall system may be used to embody an advertisement board or a large display, and may enlarge and display a received image without distorting the image.

A plurality of display apparatuses 220, 230, 240 may individually display 240-1, 240-2, 240-3, each of a plurality of sub images which are divided from one received image 210 by as many as the number of the plurality of display apparatuses 220, 230, 240, according to a location of disposition.

Accordingly, each of the plurality of display apparatuses 220, 230, 240 may display a plurality of sub images, and may consequently display an enlarged image while maintaining the aspect ratio of one received image 210.

Herein, the process of displaying the enlarged image while maintaining an aspect ratio of one received image 210 will be further explained.

Figure 3:
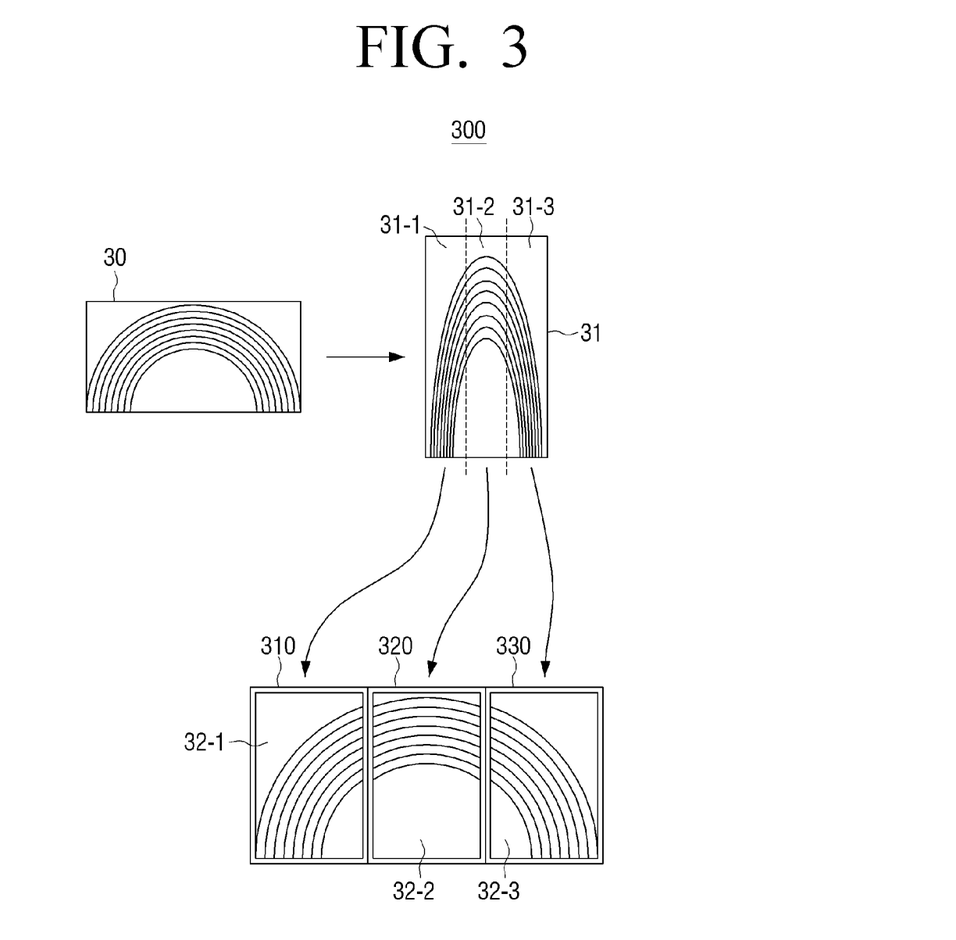
FIG. 3 is a view which illustrates a display system which processes an image according to an exemplary embodiment.

FIG. 3 is a view which illustrates a display system processing an image, according to an exemplary embodiment.

Referring to FIG. 3, each of a plurality of display apparatuses 310, 320, 330 may reverse and change width and height of one received image. In other words, each of the plurality of display apparatuses 310, 320, 330 may change an image in a horizontal direction 30 to an image in a vertical direction 31.

Specifically, each of a plurality of display apparatuses 310, 320, 330 may receive the one same image 30, and may change width and height of the received image 30, and may respectively change a horizontal image 30 to a vertical image 31.

In addition, each of the plurality of display apparatuses 310, 320, 330 may divide a changed image 31 by the number of the plurality of display apparatuses in a vertical direction and generate a plurality of sub images 31-1, 31-2, 31-3.

For example, when the display apparatuses composing a display system 300 are three in number, the changed image 31 may be evenly divided in a vertical direction to three sub images, and in response to the display apparatuses being four in number, the changed image 31 may be evenly divided in a vertical direction to provide four sub images.

Moreover, the plurality of display apparatuses 310, 320, 330 can individually display 32-1, 32-2, 32-3 the plurality of sub images 31-1, 31-2, 31-3 according to a location of disposition.

For example, a display apparatus (310) located first may determine a location of disposition from among the plurality of display apparatuses 310, 320, 330, and may display a sub image 31-1 which corresponds to the determined location of disposition as an image 32-1 adjusted to an appropriate screen ratio.

Further, the display apparatuses 320 located second may determine the location of disposition from among the plurality of display apparatuses 310, 320, 330 and may display a sub image 31-2 which corresponds to the determined location for disposition, as an image 32-2 adjusted to a screen ratio.

Further, the display apparatuses 330 located third may determine a location of disposition from among the plurality of display apparatuses 310, 320, 330 and may display a sub image 31-3 which corresponds to the determined location of disposition as an image 32-3 adjusted to a screen ratio.

The process by which the plurality of display apparatuses 310, 320, 330 determine the location of disposition will be described later.

Figure 4:
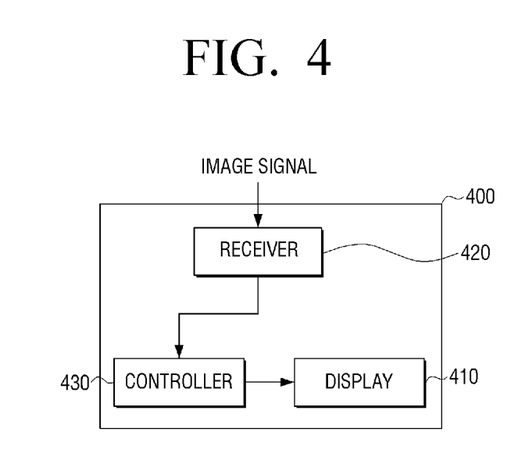
FIG. 4 is a view which illustrates a block diagram which illustrates the configuration of a display apparatus according to an exemplary embodiment.

FIG. 4 is a block diagram which illustrates a configuration of the display apparatuses, according to an exemplary embodiment.

According to FIG. 4, each of the plurality of display apparatuses, 400 includes a display 410, a receiver 420, and a controller 430. Herein, the display apparatus 400 may be embodied as an electrical apparatus of various types such as TV, Large Format Display (LFD), an electronic display, smartphone, tablet, desk top PC, notebook, etc.

The display 410 may display a moving image, a still image, a photo, etc.

The receiver 420 may receive an image signal. Herein, the receiver 420 may receive the image signal through wireless or wired communication, or through a storage media such as USB, CD, HDD or a data cable.

The controller 410 may reverse and change the width and height of the received one image through the receiver 420.

Specifically, the controller 410 may receive one image, and may change an image in a horizontal direction into an image in a vertical direction by changing the width and height of the received image.

In addition, the controller 410 may generate a plurality of sub images by dividing the images by the number of the plurality of display apparatuses in a vertical direction.

For example, in response to the display apparatuses composing a display system 200 being three in number, the controller 410 may evenly divide the changed images to three sub images in a vertical direction, and in response to the display apparatuses being four in number, the controller 410 may evenly divide the changed images into four sub images oriented in a vertical direction.

Moreover, the controller 410 may display a sub image from among the plurality of sub images which corresponds to the location of disposition on a display.

For example, a controller of the display apparatuses located first may determine a location of disposition from among the plurality of display apparatuses, and may display the first sub image which corresponds to the determined location of disposition as an image adjusted to a screen ratio.

In addition, a controller of the display apparatuses located second may determine a location of disposition from among the plurality of display apparatuses, and may display the second sub image which corresponds to the determined location for disposition as an image adjusted to a screen ratio.

For example, a controller of the display apparatuses located third may determine a location of disposition from among the plurality of display apparatuses, and may display the third sub image which corresponds to the determined location of disposition as an image adjusted to a screen ratio.

The process of determining the location of disposition is shown below.

Figure 5:
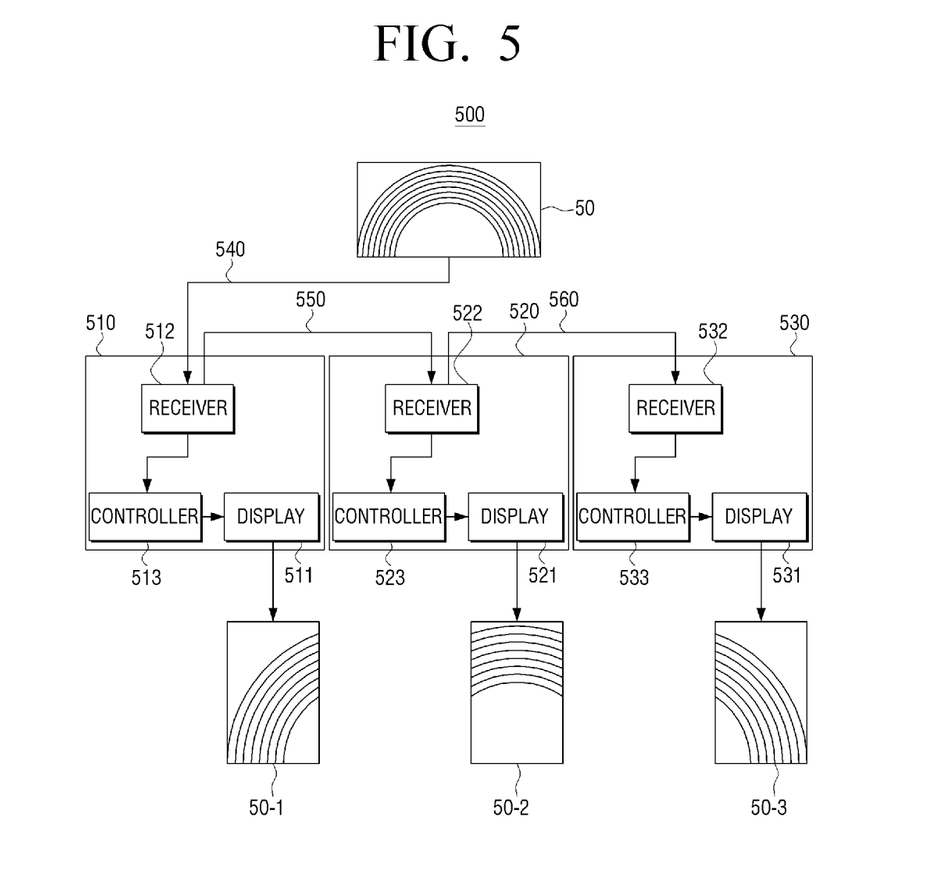
FIGS. 5-7 are views which illustrate a method of determining a location of disposition from among a plurality of display apparatuses composing a display system, according to an exemplary embodiment.
Figure 6:
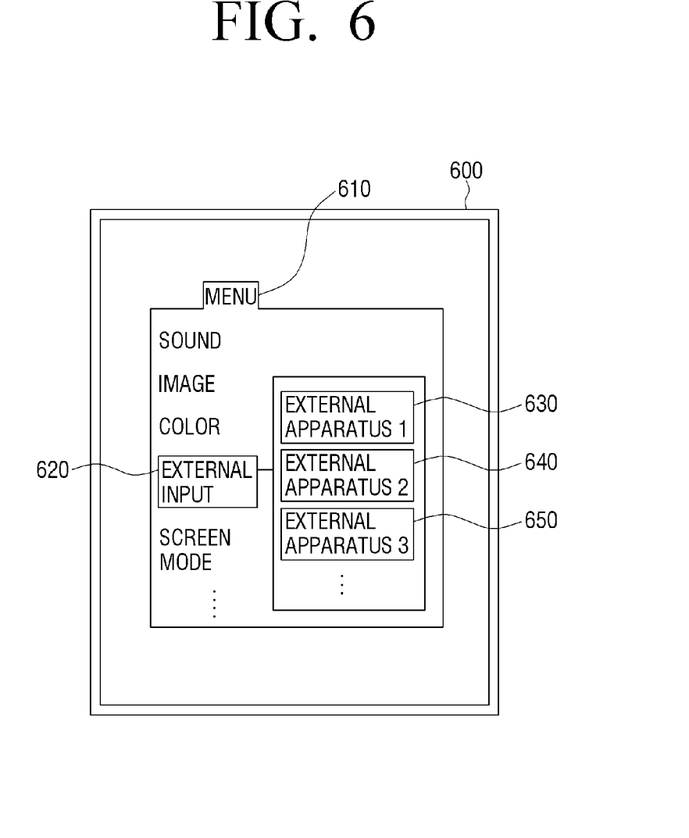
Figure 7:
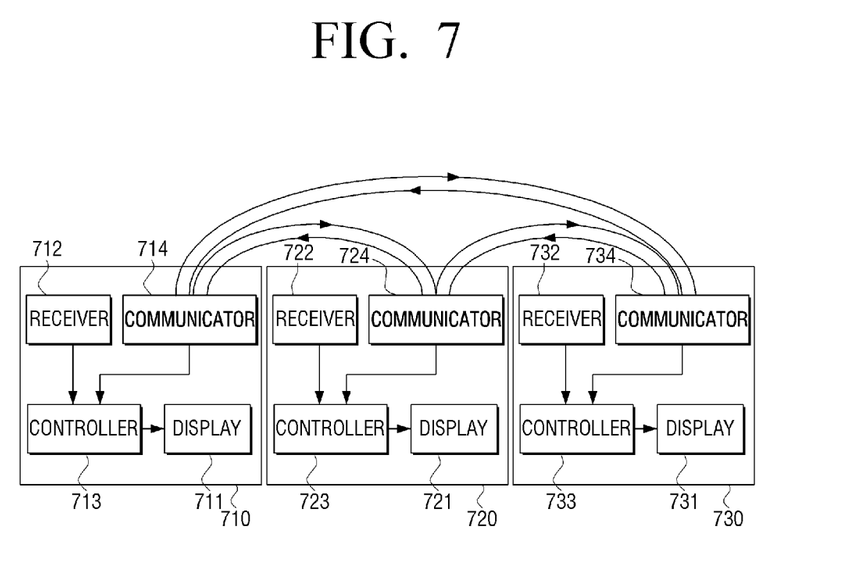

FIGS. 5-7 are views which illustrate a method of determining the location of disposition from among the plurality of display apparatuses which compose a display system, according to an exemplary embodiment.

Referring to FIG. 5, a display system 500 is comprised of the plurality of display apparatuses 510, 520, 530.

Each of the plurality of display apparatuses 510, 520, 530 include displays 511, 521, 531, receivers 512, 522, 532, and controllers 513, 523, 533 in the same manner.

Each of the plurality of receiver 512, 522, 532 may have a plurality of input ports (not illustrated) and an output port (not illustrated). For example, each of the plurality of receivers 512, 522, 532 may have input ports (not illustrated) and output ports (not illustrated). Moreover, each of the plurality of receivers 512, 522, 532 may be connected with a data cable by using one of the input ports (not illustrated) and an output port (not illustrated).

That is, one 512 of the plurality of receiver 512, 522, 523 may directly receive an image signal by using a data cable through an input port 1 (not illustrated) which is one of the plurality of input ports (not illustrated).

Further, another receiver 522 from among the plurality of receivers 512, 522, 532 may receive an image signal by using a data cable from one of the plurality of receivers 512, 522, 532 through an input port 2 (not illustrated) which is one of the plurality of input ports (not illustrated).

In addition, still another receiver 532 from among the plurality of receivers 512, 522, 532 may receive an image signal by using a data cable from one receiver 522 of the plurality of receivers 512, 522, 532 through an input port 3 (not illustrated) which is one of the plurality of input ports (not illustrated).

Each of the controllers 513, 523, 533 may determine the location of disposition based on the number of a connected input ports of the receivers 512, 522, 532.

Specifically, in response to an assumption in FIG. 5 that the display apparatus 510 located at the left end is the first display apparatus, the display apparatus 520 in the center is the second display apparatus, and the display apparatus 530 located at the right end is the third display apparatus. The first display apparatus 510 may receive an image signal of one image 50 through a data cable 540 connected to the input port of the receiver 512 of the first display apparatus 510.

Herein, the controller 513 of the first display apparatus 510 may sense that the data cable 540 is connected to an input port of the receiver 512 of the first display apparatus, and it may be determined that the first display apparatus was the first to receive the image signal from among the plurality of display apparatuses 510, 520, 530.

Accordingly, the controller 513 of the 1 display apparatus 510 may determine that the 1 display apparatus is located first.

Meanwhile, an image signal of one image 50 may be transmitted from an output port of the receiver 512 of the first display apparatus 510 through the data cable 550 connected to an input port of the receiver 522 of the second display apparatus 520.

Herein, the controller 523 of the second display apparatus 520 may sense that the data cable 550 is connected to an input port of the receiver 522 of the second display apparatus, and it may be determined that the second display apparatus was the second display apparatus to receive the image signal from among the plurality of display apparatuses 510, 520, 530.

Accordingly, the controller 523 of the second display apparatus 520 may determine that the second display apparatus is located second.

Meanwhile, an image signal of one image 50 may be transmitted from an output port of the receiver 522 of the second display apparatus 520 through the data cable 560 connected to an input port of the receiver 532 of the third display apparatus 530.

Herein, the controller 533 of the third display apparatus 530 may sense that the data cable 560 is connected to an input port of the receiver 532 of the third display apparatus, and it may be determined that the third display apparatus was the third to receive the image signal from among the plurality of display apparatuses 510, 520, 530.

Accordingly, the controller 533 of the third display apparatus 530 may determine that the third display apparatus is located third.

As described above, each of the controllers 513, 523, 533 may determine the location of disposition based on the number of connected input ports of the receivers 512, 522, 532.

In addition, each of the controller 513, 523, 533 may reverse and change the width and height of one image 50 received through receivers 512, 522, 532, and may divide the changed image into three sub images in a vertical direction by as many as the number of the display apparatuses 510, 520, 530.

Each of the controllers 513, 523, 533 may adjust the ratio of width to height of a sub image which corresponds to the determined location of disposition based on the number of input ports connected to receivers 512, 522, 532, according to a screen ratio of the displays 511, 521, 531, and may display the adjusted images 50-1, 50-2, 50-3.

That is, the controller 513 of the first display apparatus 510, based on the data cable 540 connected to an input port may determine that the first display apparatus 510 is located first and may display an image 50-1 which is an adjusted sub image which corresponds to the determined first location, based on a screen ratio.

In addition, the controller 523 of the second display apparatus 520, based on the data cable 550 connected to an input port, may determine that the second display apparatus 520 is located second and may display an image 50-2 which is an adjusted sub image which corresponds to the determined first location based on a screen ratio.

In addition, the controller 533 of the third display apparatus 530, based on the data cable 560 connected to an input port 1, may determine that the third display apparatus 530 is located second and may display an image 50-3 which is an adjusted sub image which corresponds to the determined first location based on a screen ratio.

Referring to FIG. 6, the display apparatus 600 may include an interface which receives setting information related to the location of disposition. Herein, the interface which receives setting information may be embodied as a button key to input the location of disposition, OSD screen or Graphic User Interface (GUI) to input the location of disposition.

In the case of an interface embodied with a button key, a user may input a button key which corresponds to the number of the location of disposition of a display apparatus and may set the location of disposition of the display apparatus.

In addition, as shown FIG. 6, an OSD screen 610 which receives setting information on a display may be displayed in order to receive the setting information.

Specifically, when a menu screen 610 is displayed on a display, a sub menu to set sound, image, color, external input, screen mode, etc. is displayed, wherein, when a sub menu 620 on an external input is selected, a sub screen to select in which number the display apparatus will be set as an external apparatus may be displayed.

In a sub screen, a menu button to set the location of a display apparatus such as a first external apparatus 1 630, a second external device 2 640, and a third external device 3 650, may be activated and displayed.

Accordingly, when a user touches an external apparatus 1 630, the corresponding display apparatus may be set as a display apparatus located first. When a user touches an external apparatus 2 640, the corresponding display apparatus may be set as a second display apparatus located, and when a user touches an external apparatus 3 650, the corresponding apparatus may be set as a third display apparatus.

In addition, each of the controllers (not illustrated) may determine a location of disposition of the corresponding display apparatus according to the number information of the external apparatus.

Each of the controllers (not illustrated) may adjust the width to height ratio of a sub image which corresponds to the determined location of disposition, based on a screen ratio of a display, and may display the adjusted image.

Referring to FIG. 7, each of the plurality of display apparatuses 710, 720, 730 may include a communicator 714, 724, 734 which stores and transmits/receives the plurality of identification numbers and their own identification number. Herein, each of the communicators 714, 724, 734 may include a cache memory or buffer which may store the plurality of identification numbers and their own identification numbers.

For example, as the plurality of identification numbers, identification number 01 corresponds to the first location, identification number 10 corresponds to the second location, and identification number 11 which corresponds to the third location may be stored, and the own identification number is the number set in each display apparatus, which may be one of the plurality of identification numbers, that is 01, 10, 11.

In addition, each of the controllers 713, 723, 733 may transmit the plurality of identification numbers 01, 10, 11 to other display apparatuses through infrared communication, Bluetooth®, WiFi, Zig-Bee®, etc.

Meanwhile, each of the controllers 713, 723, 733 may transmit a response signal related to one of the plurality of identification numbers which corresponds to their own identification numbers from among the received plurality of identification numbers 01, 10, 11.

In addition, each of the controllers 713, 723, 733 may determine a location of disposition on the transmitted plurality of identification numbers based on the received response signal.

Specifically, in response to an assumption in FIG. 7 that the display apparatus 710 at the left end is the first display apparatus, the display apparatus 720 in the center is the second display apparatus, and the display apparatus 730 an the right end is the third display apparatus, the communicator 714 of the 1 display apparatus 710 may send a stored plurality of identification numbers 01, 10, 11 to the second display apparatus 720 and the third display apparatus 730, and may receive a response signal from the second display apparatus 720 and the third display apparatus 730.

That is, as the identification number of the second display apparatuses 720 is set to 10, the controller 723 of the second display apparatus 720 may not transmit a response signal related to identification numbers 01 and 11 received from the 1 display apparatuses 710, but may transmit a response signal related to identification number 10.

In addition, in response to the identification number of the third display apparatus 730 being set to 11, the controller 733 of the third display apparatus 730 may not transmit a response signal related to identification numbers 01 and 10 received from the first display apparatus 710, and may transmit a response signal only with respect to identification number 11.

Accordingly, the controller 713 of the first display apparatus 710 may sense that a response signal of 10 and 11 from among the plurality of identification numbers 01, 10, and 11 from the second display apparatus 720 and the third display apparatus 730, may recognize that the identification number of the first display apparatus 710 is 01, and then determine that location of disposition is the first display apparatus.

The controller 713 of the first display apparatus 710 may determine the location of disposition of the second display apparatus 720 and the display apparatus 730.

Meanwhile, the controllers 723, 733 of the second display apparatus 720 and the third display apparatus 730 may determine the location of disposition based on a response signal which is received after the plurality of identification numbers 01, 10, 11 are transmitted to external display apparatuses.

Each of the controllers 713, 723, 733 may reverse and change the width and height of one image (not illustrated) received through the receivers 712, 722, 724, and generate three sub images by dividing the changed image into three sub images in a vertical direction as the same as the number of display apparatuses 710, 720, 730.

Each of the controllers 713, 723, 733 may adjust a width to height ratio of a sub image which corresponds to the location of disposition which corresponds to the location of disposition, based on the received response signal according to a screen ratio of displays 711, 721, 731, and display the screen images according to the screen ratio.

Figure 8A:
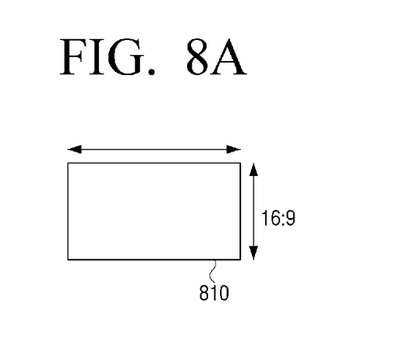
FIGS. 8a-8b are views which illustrate one set of three display apparatuses having a screen aspect ratio of 16:9 which are rotated in a vertical direction and disposed in parallel with each other, according to an exemplary embodiment.
Figure 8B:
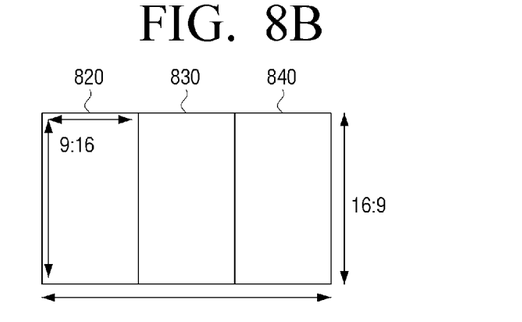

FIGS. 8a and 8b are views which illustrate one set where three display apparatuses having a screen aspect ratio of 16:9 are rotated in a vertical direction and disposed in parallel with each other.

That is, the plurality of display apparatuses may display one full screen, as three display apparatuses which are rotated in a vertical direction and disposed in parallel with each other compose one set, wherein one set composed of three displays 820, 830, 840 are disposed in parallel with each other.

In addition, a screen ratio of width to height of one display 810 is 16:9, and a ratio of width to height of an entire screen where three displays 820, 830, 840 are disposed in parallel with each other and displayed is also 16:9.

Specifically, FIG. 8a illustrates a display 810 having width to height ratio of 16:9, FIG. 8b illustrates 3 display apparatuses rotated in a vertical direction so that displays 820, 830, 840 of each display apparatus constitute one full screen. Herein, it is known that the ratio of width to height of a full screen is 16:9.

That is, the width of a full screen is 27 and height is 16, and thus a ratio of width to height is 27:16, which is the same as 16:9.

Accordingly, if three display apparatuses are rotated in a vertical direction and connected to each other, the ratio of a full screen where three displays 820, 830, 840 are rotated in a vertical direction and connected to each other is 16:9, and thus one image may be displayed in the same ratio as the ratio of the one received image.

In the above exemplary embodiment, a ratio of a full screen is 16:9 is embodied by using three display apparatuses. However, the number of the display apparatuses may be changed.

For example, by using twelve display apparatuses, a screen ratio may be 16:9.

That is, ratio of the width to length of a full screen which is displayed on one set where twelve display apparatuses are rotated in a vertical direction and disposed in parallel to each other is 54:32, which is the same ratio as 16:9.

When using twelve display apparatuses, one received image is divided into twelve sub images, and in this case a sub image which corresponds to the location of disposition needs to be displayed in accordance with a screen ratio.

Figure 9:
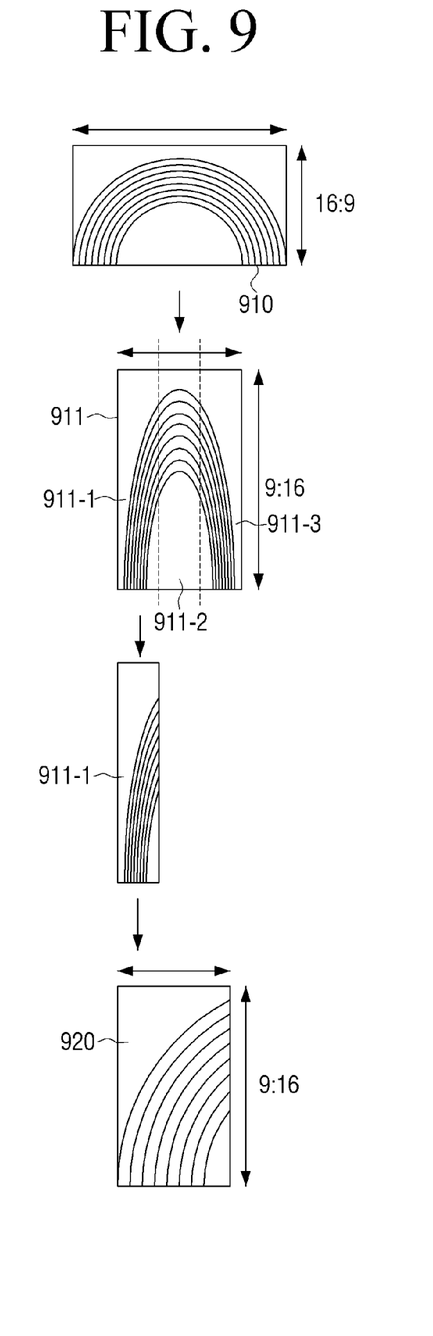
FIG. 9 is a view which illustrates a process of adjusting a sub image which corresponds to a location for disposition from among divided sub images and displaying the image according to an exemplary embodiment.

FIG. 9 is a view which illustrates a process of displaying a sub image which corresponds to a location of disposition, in accordance with a screen ratio.

When one image 910 whose ratio of width to height is 16:9 is input, the controller (not illustrated) may reverse the width and length of the one received image 910 and change the image to an image 911 in a vertical direction.

In addition, the controller (not illustrated) may divide the changed image 911 in a vertical direction by as many as the number of the plurality of display apparatuses, and may generate a plurality of sub images 911-1, 911-2, 911-3.

In addition, the controller (not illustrated) may capture a sub image 911-1 which corresponds to the determined location of disposition.

A sub image 911-1 which corresponds to the location of disposition of the controller (not illustrated) may be adjusted based on a screen ratio of the display, and the adjusted image 920 may be displayed.

That is, the controller (not illustrated) may adjust the sub image 911-1 which corresponds to the location of disposition, to have a ratio of width to height of 9:16 which is the ratio of a display rotated in a vertical direction, and may display the adjusted image 920.

Accordingly, by adjusting sub images 911-1, 911-2, 911-3 which correspond to the location of disposition based on a screen ratio of the display and displaying the images, the controller may display a received image on a full screen composed of the plurality of displays connected to each other.

Figure 10:
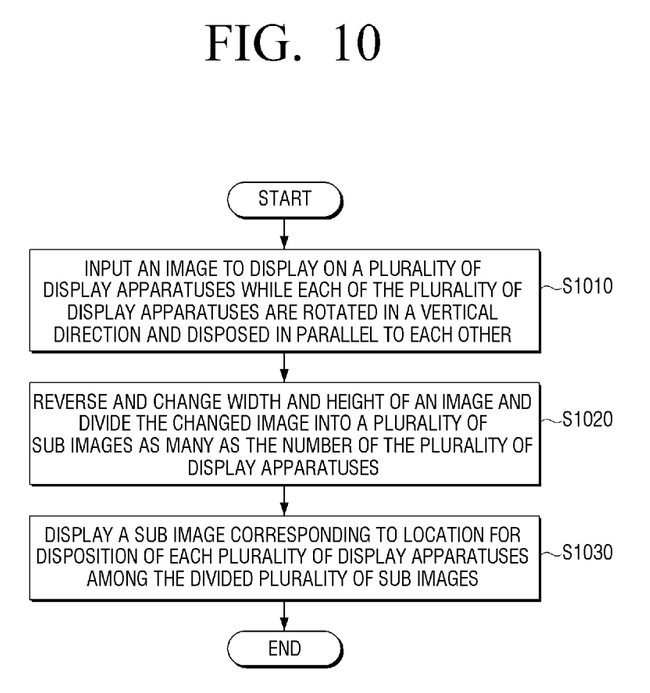
FIG. 10 is a view which illustrates a flow chart to explain a display method using a plurality of display apparatuses according to an exemplary embodiment.

FIG. 10 is a view which illustrates a flow chart to explain a displaying method by using the plurality of display apparatuses, according to an exemplary embodiment.

According to a method illustrated in FIG. 10, while the plurality of display apparatuses are rotated in a vertical direction and disposed in parallel with each other, an image to be displayed on the plurality of display apparatuses may be received (S1010).

In addition, the width and height of an image may be reversed and changed, and the changed image may be divided into the plurality of sub images by as many as the number of the plurality of display apparatuses (S1020).

Herein, the controller may reverse and change the width and height of the one image received from the receiver.

Specifically, the controller may receive one image, and may change an image in a horizontal direction to an image in a vertical direction by changing width and height of the received image.

The controller may divide the changed image by as many as the plurality of display apparatuses in a vertical direction and generate the plurality of sub images.

For example, if the display apparatuses composed in a display system are three in number, the controller may evenly divide the changed image into three images and may generate three sub images. If the display apparatuses are four in number, the controller may evenly divide the changed image into four images and may generate four sub images.

In addition, a sub image from among the divided plurality of sub images, which corresponds to each location of disposition may be displayed (S1030).

Herein, the controller may display a sub image which corresponds to the location of disposition from among the plurality of sub images on the display.

For example, the controller of the display apparatus located first may determine the location of disposition from among the plurality of display apparatuses, and may display the first sub image which corresponds to the determined location of disposition as an image adjusted based on a screen ratio.

Also, the controller of the display apparatus located second may determine the location of disposition from among the plurality of display apparatuses, and may display the second sub image which corresponds to the determined location of disposition as an image adjusted based on a screen ratio.

The controller of the display apparatus located third may determine the location of disposition from among the plurality of display apparatuses, and may display the third sub image which corresponds to the determined location for disposition as an image adjusted based on a screen ratio.

In addition, a non-transitory computer readable storage medium may be provided where a program sequentially performs a control method according to an exemplary embodiment.

For example, a non-transitory computer readable medium may be provided where a program which performs reversing and changing the width and height of an image and dividing the changed image to the plurality of sub images by as many as the plurality of display apparatuses; displaying a sub image which corresponds to the location of disposition of the plurality of display apparatuses from among the divided plurality of sub images is stored may be provided.

A non-transitory computer readable storage medium indicates media which semi-permanently stores data and is readable with a device, not a media which stores data for a short period of time such as register, cache, memory, etc. Specifically, the above-described various applications or programs may be stored and provided in a non-transitory computer readable storage medium such as CD, DVD, hard disk, Blue-ray Disk™, USB, memory card, ROM, etc.

Moreover, the above-described block diagram illustrating a display apparatus does not illustrate a Bus, but communication among components of display apparatuses may be performed through a Bus. In addition, each device may further include a processor such as a CPU and micro processor which performs the above-described various steps.

The foregoing exemplary embodiments and advantages are merely exemplary and are not to be construed as limiting. The present teachings can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display system, comprising:
display apparatuses, each corresponding display apparatus is configured to be rotated in a vertical direction, to have a longer dimension disposed in the vertical direction and a shorter dimension disposed in a horizontal direction, to dispose the display apparatuses in parallel with each other,
wherein a width length and a height length of each of the display apparatuses are different,
wherein the display apparatuses are configured to receive a common image having a longer dimension in the horizontal direction and a shorter dimension in the vertical direction, reverse an orientation of the common image by changing a width and a length of the common image to have the longer dimension of the common image become disposed in the vertical direction and the shorter dimension become disposed in the horizontal direction, and individually display each of sub images, which are generated by dividing, in the vertical direction, the common image, the width and the length of which have been changed, by a total number of the display apparatuses and by changing a proportion of the sub images to avoid a distortion of a large common image on the display apparatuses, based on a respective location at which the corresponding display apparatus is disposed.

2. The system of claim 1, wherein each corresponding display apparatus comprises:
a display;
a receiver configured to receive the common image; and
a controller configured to reverse the orientation of the common image, change the width and length of the common image, and control the display to display the sub image, which corresponds to the respective location of the corresponding display apparatus, among the sub images.

3. The system of claim 2, wherein the display apparatuses are disposed in an order corresponding to natural numbers 1 to n,
each of the receivers has an input port having a number corresponding to the order of the corresponding display apparatus,
the controller determines the respective location of the display based on the number of a respective input port of the receiver, and
the number n is the total number of the display apparatuses and is equal to or greater than 2.

4. The system of claim 2, wherein each of the display apparatuses further comprises:
an interface configured to receive an input comprising a setting information related to the respective location of the corresponding display apparatus,
wherein each controller is configured to determine the respective location based on the received setting information.

5. The system of claim 2, wherein a screen ratio of each display is the same, and
wherein each of the controllers is configured to adjust a screen ratio of the sub image, which corresponds to the respective location, to the screen ratio of the display and control the display to display the sub image.

6. The system of claim 5, wherein the total number of the display apparatuses is three, and
the display apparatuses are configured to be respectively rotated in the vertical direction and disposed in parallel with each other so that three displays of the display apparatuses form one full screen.

7. The system of claim 6, wherein the screen ratio of a length to a width of each display of the rotated display apparatuses is 16:9, and
a screen ratio of a width to a length of the full screen is 16:9.

8. A display apparatus, comprising:
a display which is configured to be disposed along other displays, wherein the display is rotated in a vertical direction to have a longer dimension disposed in the vertical direction and a shorter dimension disposed in a horizontal direction;
wherein a width length and a height length of the display and the other displays are different, and
a controller configured to receive an image having a longer dimension in the horizontal direction and a shorter dimension in the vertical direction, reverse an orientation of the image by changing a width and a length of the image to have the longer dimension of the image become disposed in the vertical direction and the shorter dimension become disposed in the horizontal direction, when the display is disposed along the other displays, and control the display to display a sub image, which corresponds to a respective location at which the display apparatus is disposed, among sub images which are generated by dividing the image in the vertical direction by a total number of the display and the other displays and by changing a proportion of the sub images to avoid a distortion of a large common image on the display and the other displays.

9. A control method comprising:
receiving a common image to be displayed on display apparatuses, the common image having a longer dimension in a horizontal direction and a shorter dimension in a vertical direction, wherein corresponding display apparatuses are rotated in a vertical direction to have a longer dimension disposed in the vertical direction and a shorter dimension disposed in a horizontal direction, to dispose the display apparatuses in parallel with each other and wherein a width length and a height length of each display apparatus are different;
reversing an orientation of the common image by changing a width and a length of the common image to have the longer dimension become disposed in the vertical direction and the shorter dimension become disposed in the horizontal direction;
dividing the changed image into sub images by dividing, in the vertical direction, the common image by a total number of the display apparatuses;
changing a proportion of the sub images to avoid a distortion of an entire common image on the display apparatuses; and
displaying, by the corresponding display apparatus, a sub image which corresponds to a respective location at which the corresponding display apparatus is disposed, among the sub images.

10. The method of claim 9, wherein the display apparatuses are disposed in an order corresponding to natural numbers 1 to n,
the displaying the sub image comprises determining the respective location of the display apparatus based on a number corresponding to the order of the corresponding display apparatus, and
the number n is the total number of the display apparatuses and is equal to or greater than 2.

11. The method of claim 9, further comprising:
receiving an input comprising a setting information related to the respective location of the corresponding display apparatus,
wherein the displaying the sub image comprises determining the respective location based on the received setting information.

12. The method of claim 9, wherein the displaying the sub image comprises adjusting a screen ratio of the sub image, which corresponds to the respective location, to a screen ratio of a display of the corresponding display apparatus, and
displaying the sub image with the adjusted screen ratio on the display of the corresponding display apparatus.

13. The method of claim 12, wherein the total number of the display apparatuses is three,
the display apparatuses are rotated respectively in the vertical direction to be disposed in parallel with each other, for forming a set comprised of three displays of the rotated display apparatuses, and
the three displays of the set are disposed in parallel to each other and form one full screen.

14. The method of claim 13, wherein the screen ratio of the length to the width of each display of the rotated display apparatuses is 16:9, and
a screen ratio of a width to a length of the full screen is 16:9.

15. A video wall system embodying an advertisement board or a large display by enlarging and displaying a received image without distorting the image, the system comprising:
display apparatuses configured to individually display sub images divided from the received image;
wherein a width length and a height length of each display apparatus are different, and
wherein each corresponding display apparatus includes:
a receiver configured to receive a common image having a longer dimension in a horizontal direction and a shorter dimension in a vertical direction;
a controller configured to reverse an orientation of the common image by changing a width and a length of the common image to have the longer dimension of the image become disposed in the vertical direction and the shorter dimension become disposed in the horizontal direction, and divide the changed image into the sub images based on a total number of the display apparatuses and change a proportion of the sub images to avoid a distortion of an entire common image on the display apparatuses; and
a display configured to display an individual sub image which corresponds to a respective location at which the corresponding display apparatus is disposed, among the sub images,
wherein the video wall system displays an enlarged image while maintaining an aspect ratio of the received image.

16. The system of claim 15, wherein the controller of each corresponding display apparatus is configured to reverse the orientation of the common image and change the width and length of the common image when the display apparatuses are disposed along one another by being rotated in the vertical direction.

17. The system of claim 15, wherein the display apparatuses are disposed in an order corresponding to natural numbers 1 to n,
the receiver of the corresponding display apparatus has an input port having a number corresponding to the order of the corresponding display apparatus, the controller determines the respective location of the corresponding display apparatus based on the number of a respective input port of the receiver, and the number n is the total number of the display apparatuses and is equal to or greater than 2.

18. The system of claim 15, further comprising:

an interface configured to receive an input comprising a setting information related to the respective location, wherein the controller of each of the display apparatuses is configured to determine the respective location based on the received setting information.

19. The display-system of claim 15, wherein a screen ratio of each display is the same, and the controller of each of the display apparatuses is configured to adjust a screen ratio of the sub image, which corresponds to the respective location, to the screen ratio of the display and control the display to display the sub image.

20. The system of claim 15, wherein the total number of the display apparatuses is three, and the display apparatuses are configured to be respectively rotated in the vertical direction and disposed in parallel with each other so that three displays of the display apparatuses form one full screen.

* * * * *